US008886477B2

(12) United States Patent
Imahara et al.

(10) Patent No.: US 8,886,477 B2
(45) Date of Patent: Nov. 11, 2014

(54) RESERVE CAPACITY CALCULATING APPARATUS AND METHOD THEREFOR, AND COMPUTER READABLE MEDIUM

(75) Inventors: Shuichiro Imahara, Kawasaki (JP); Kazuto Kubota, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 335 days.

(21) Appl. No.: 13/234,528

(22) Filed: Sep. 16, 2011

(65) Prior Publication Data

US 2012/0245868 A1 Sep. 27, 2012

(30) Foreign Application Priority Data

Mar. 25, 2011 (JP) .................................. 2011-67346

(51) Int. Cl.
*G01R 21/00* (2006.01)
(52) U.S. Cl.
USPC .......................................................... 702/61
(58) Field of Classification Search
USPC .......................................................... 702/61
See application file for complete search history.

(56) References Cited

U.S. PATENT DOCUMENTS

| | | | | |
|---|---|---|---|---|
| 5,963,457 A * | 10/1999 | Kanoi et al. | .................. | 700/291 |
| 6,061,609 A * | 5/2000 | Kanoi et al. | .................. | 700/291 |
| 6,301,674 B1 * | 10/2001 | Saito et al. | ..................... | 713/340 |
| 6,774,506 B2 * | 8/2004 | Hashimoto et al. | ............. | 307/38 |
| 6,885,914 B2 * | 4/2005 | Shimode et al. | ............. | 700/288 |
| 6,912,889 B2 * | 7/2005 | Staphanos et al. | ........... | 73/23.31 |
| 7,321,810 B2 * | 1/2008 | Mansingh et al. | ............ | 700/286 |
| 7,844,366 B2 * | 11/2010 | Singh | ............................ | 700/276 |
| 8,046,110 B2 * | 10/2011 | Mayor et al. | .................. | 700/297 |
| 8,450,995 B2 * | 5/2013 | Wagner | ......................... | 324/142 |
| 8,515,588 B2 * | 8/2013 | Warner | ......................... | 700/287 |
| 2003/0204759 A1 * | 10/2003 | Singh | ............................ | 713/320 |
| 2004/0024483 A1 * | 2/2004 | Holcombe | ..................... | 700/122 |
| 2009/0195349 A1 * | 8/2009 | Frader-Thompson et al. | | 340/3.1 |
| 2010/0222934 A1 * | 9/2010 | Iino et al. | ..................... | 700/291 |
| 2010/0318227 A1 * | 12/2010 | Steinberg et al. | ............ | 700/278 |
| 2011/0029655 A1 * | 2/2011 | Forbes et al. | .................. | 709/223 |
| 2011/0040550 A1 * | 2/2011 | Graber et al. | ................... | 703/18 |
| 2011/0077896 A1 * | 3/2011 | Steinberg et al. | ............ | 702/130 |
| 2011/0106321 A1 * | 5/2011 | Cherian et al. | ............... | 700/286 |
| 2011/0161250 A1 * | 6/2011 | Koeppel et al. | .............. | 705/412 |
| 2011/0166828 A1 * | 7/2011 | Steinberg et al. | ............ | 702/182 |
| 2011/0172841 A1 * | 7/2011 | Forbes, Jr. | ..................... | 700/292 |

(Continued)

FOREIGN PATENT DOCUMENTS

JP 2010-166636 7/2010

*Primary Examiner* — Sujoy Kundu
*Assistant Examiner* — Alvaro Fortich
(74) *Attorney, Agent, or Firm* — Amin, Turocy & Watson, LLP

(57) ABSTRACT

A power consumption distribution calculator uses a predicted outdoor temperature sequence of the customer house for a prediction period at a first date from a first time to a second time, and identifies dates having a sequence part similar to the predicted outdoor temperature sequence in the prediction period, identifies power consumption sequences corresponding to identified dates, and calculate a statistical distribution or a representative value of identified power consumption sequences for a whole period from a third time to the second time, the third time being earlier than the first time. A power consumption predicting unit calculates a predicted power consumption sequence in the prediction period based on the statistical distribution or the representative value. A reserve capacity calculating unit calculates reserve capacity being a difference between a predicted power consumption sequence and a sequence part in the prediction period of the reference power consumption sequence.

10 Claims, 20 Drawing Sheets

(56) References Cited

U.S. PATENT DOCUMENTS

2011/0239013 A1* 9/2011 Muller .......................... 713/320
2011/0251731 A1* 10/2011 Yang et al. ................... 700/296
2011/0251732 A1* 10/2011 Schweitzer et al. .......... 700/297
2011/0304475 A1* 12/2011 Higgins et al. ........... 340/870.07
2012/0116600 A1* 5/2012 Schmid et al. ................ 700/291

* cited by examiner

PREDICTED PARAMETER DB

| CURRENT TIME | PREDICTION PERIOD LENGTH | HISTORY USED PERIOD LENGTH |
|---|---|---|
| 00:00:00 | 60 MINUTES | 120 MINUTES |
| | 120 MINUTES | 180 MINUTES |
| 00:00:30 | 60 MINUTES | 120 MINUTES |
| | 120 MINUTES | 180 MINUTES |
| ... | ... | ... |

FIG. 4

EXAMPLE OF PREDICTED PARAMETER DB

| CURRENT TIME | PREDICTION PERIOD LENGTH | HISTORY USED PERIOD LENGTH |
|---|---|---|
| 00:00:00 | 60 MINUTES | ? |
| | 120 MINUTES | ? |
| 00:00:30 | 60 MINUTES | ? |
| | 120 MINUTES | ? |
| ... | ... | ... |

FIG. 14

LIVING INFORMATION HISTORY

| LIVING INFORMATION HISTORY | | | ROOM 1 | ROOM 2 | ROOM 3 | ROOM TEMPERATURE | | ROOM TEMPERATURE | | ROOM TEMPERATURE | | AIR CONDITIONER 1 | AIR CONDITIONER 2 | AIR CONDITIONER 3 | TV1 | IH | WASHING MACHINE |
|---|---|---|---|---|---|---|---|---|---|---|---|---|---|---|---|---|---|
| RECORD | Day | Time | R[1] | R[2] | R[3] | Tem | | Tem | Hum | Tem | Hum | HA[1] | HA[2] | HA[3] | HA[4] | HA[5] | HA[6] |
| ... | ... | ... | ... | ... | ... | ... | ... | ... | ... | ... | ... | ... | ... | ... | ... | ... | ... |
| 1000 | 9/5 | 12:00 | | | | 33 | | 25 | 33 | 30 | | | | | | | |
| 1001 | 9/5 | 12:01 | | | | 33 | | 25 | 33 | 30 | | | | | | ON | |
| 1002 | 9/5 | 12:02 | 1 | | | 33 | | 25 | 33 | 30 | | 25 | | | | ON | |
| 1003 | 9/5 | 12:03 | 1 | | | 33 | | 25 | 33 | 30 | | 25 | | | | | |
| 1004 | 9/5 | 12:04 | 1 | | | 33 | | 25 | 33 | 30 | | 25 | | | | | |
| 1005 | 9/5 | 12:05 | 1 | | | 33 | | 25 | 33 | 30 | | 25 | | | | | |
| 1006 | 9/5 | 12:06 | 1 | | | 33 | | 25 | 33 | 30 | | 25 | | | | | ON |
| 1007 | 9/5 | 12:07 | 1 | | | 33 | | 25 | 33 | 30 | | 25 | | | | | ON |
| 1008 | 9/5 | 12:08 | 1 | | | 33 | | 25 | 33 | 30 | | 25 | | | | | ON |
| 1009 | 9/5 | 12:09 | 1 | | | 33 | | 25 | 33 | 30 | | 25 | | | | | ON |
| 1010 | 9/5 | 12:10 | 1 | | | 33 | | 25 | 33 | 30 | | 25 | | | | | ON |
| 1011 | 9/5 | 12:11 | 1 | | | 33 | | 25 | 33 | 30 | | 25 | | | | | |
| 1012 | 9/5 | 12:12 | 1 | | | 33 | | 26 | 33 | 32 | | 25 | | 25 | | | |
| 1013 | 9/5 | 12:13 | 1 | | | 33 | | 26 | 33 | 32 | | | | 25 | | | |
| 1014 | 9/5 | 12:14 | 1 | | | 33 | | 26 | 33 | 32 | | | | 25 | | | |
| 1015 | 9/5 | 12:15 | | | 1 | 33 | | 27 | 33 | 32 | | | | 25 | | | |
| 1016 | 9/5 | 12:16 | | | 1 | 33 | | 27 | 33 | 31 | | | | 25 | | | |
| 1017 | 9/5 | 12:17 | | | 1 | 33 | | 27 | 33 | 31 | | | | 25 | | | |
| 1018 | 9/5 | 12:18 | | | 1 | 33 | | 27 | 33 | 30 | | | | 25 | ON | | |
| 1019 | 9/5 | 12:19 | | | 1 | 33 | | 27 | 33 | 30 | | | | 25 | ON | | |
| 1020 | 9/5 | 12:20 | | | 1 | 33 | | 28 | 33 | 30 | | | | 25 | ON | | |
| 1021 | 9/5 | 12:21 | | | 1 | 33 | | 28 | 33 | 29 | | | | 25 | ON | | |
| 1022 | 9/5 | 12:22 | | | | 33 | | 28 | 33 | 24 | | | | | ON | | |
| ... | ... | ... | ... | ... | ... | ... | ... | ... | ... | ... | ... | ... | ... | ... | ... | ... | ... |

FIG. 18

| LIVING INFORMATION HISTORY ||||||
| RECORD | Day | Time | ROOM 1 R[1] | ROOM 2 R[2] | ROOM 3 R[3] |
| --- | --- | --- | --- | --- | --- |
| ... | ... | ... | ... | ... | ... |
| ... | ... | ... | ... | ... | ... |
| 1000 | 9/5 | 12:00 | 1 | | |
| 1001 | 9/5 | 12:01 | 1 | | |
| 1002 | 9/5 | 12:02 | 1 | | |
| 1003 | 9/5 | 12:03 | 1 | | |
| 1004 | 9/5 | 12:04 | 1 | | |
| 1005 | 9/5 | 12:05 | 1 | | |
| 1006 | 9/5 | 12:06 | 1 | | |
| 1007 | 9/5 | 12:07 | 1 | | |
| 1008 | 9/5 | 12:08 | 1 | | |
| 1009 | 9/5 | 12:09 | 1 | | |
| 1010 | 9/5 | 12:10 | 1 | | |
| 1011 | 9/5 | 12:11 | 1 | | |
| 1012 | 9/5 | 12:12 | 1 | | |
| 1013 | 9/5 | 12:13 | | | 1 |
| 1014 | 9/5 | 12:14 | | | 1 |
| 1015 | 9/5 | 12:15 | | | 1 |
| 1016 | 9/5 | 12:16 | | | 1 |
| 1017 | 9/5 | 12:17 | | | 1 |
| 1018 | 9/5 | 12:18 | | | 1 |
| 1019 | 9/5 | 12:19 | | | 1 |
| 1020 | 9/5 | 12:20 | | | 1 |
| 1021 | 9/5 | 12:21 | | | 1 |
| 1022 | 9/5 | 12:22 | | | 1 |
| 1023 | 9/5 | 12:23 | | | 1 |
| 1024 | 9/5 | 12:24 | | | 1 |
| 1015 | 9/5 | 12:25 | | | 1 |
| 1026 | 9/5 | 12:26 | | | 1 |
| 1027 | 9/5 | 12:27 | | | 1 |
| ... | ... | ... | ... | ... | ... |
| ... | ... | ... | ... | ... | ... |

FIG. 18A

| OUTDOOR TEMPERATURE Tem | ROOM TEMPERATURE 1 Humi | ROOM TEMPERATURE 2 Humi | ROOM TEMPERATURE 3 Humi | AIR CONDITIONER 1 HA[1] | AIR CONDITIONER 2 HA[2] | AIR CONDITIONER 3 HA[3] |
|---|---|---|---|---|---|---|
| ... | ... | ... | ... | ... | ... | ... |
| ... | ... | ... | ... | ... | ... | ... |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 25 | 33 | 33 | 25 | | |
| 33 | 26 | 33 | 32 | | | 25 |
| 33 | 26 | 33 | 32 | | | 25 |
| 33 | 26 | 33 | 32 | | | 25 |
| 33 | 26 | 33 | 32 | | | 25 |
| 33 | 26 | 33 | 32 | | | 25 |
| 33 | 27 | 33 | 31 | | | 25 |
| 33 | 27 | 33 | 31 | | | 25 |
| 33 | 27 | 33 | 31 | | | 25 |
| 33 | 27 | 33 | 31 | | | 25 |
| 33 | 27 | 33 | 30 | | | 25 |
| 33 | 27 | 33 | 30 | | | 25 |
| 33 | 28 | 33 | 30 | | | 25 |
| 33 | 28 | 33 | 30 | | | 25 |
| 33 | 28 | 33 | 29 | | | 25 |
| 33 | 28 | 33 | 29 | | | 25 |
| ... | ... | ... | ... | ... | ... | ... |
| ... | ... | ... | ... | ... | ... | ... |

FIG. 18B

| TV1 HA[4] | IH HA[5] | WASHING MACHINE HA[6] |
|---|---|---|
| ... | ... | ... |
| ... | ... | ... |
|  | ON |  |
|  | ON |  |
|  |  |  |
|  |  |  |
|  |  |  |
|  |  |  |
|  |  |  |
|  | ON |  |
|  | ON |  |
|  | ON |  |
|  | ON |  |
|  | ON |  |
|  |  |  |
|  |  |  |
|  |  |  |
|  |  |  |
|  |  |  |
|  |  |  |
|  |  |  |
|  |  |  |
| ON |  |  |
| ON |  |  |
| ON |  |  |
| ON |  |  |
| ON |  |  |
| ... | ... | ... |
| ... | ... | ... |

FIG. 18C

RESERVE CAPACITY CALCULATING APPARATUS AND METHOD THEREFOR, AND COMPUTER READABLE MEDIUM

CROSS REFERENCE TO RELATED APPLICATIONS

This application is based upon and claims the benefit of priority from the prior Japanese Patent Application No. 2011-67346, filed on Mar. 25, 2011, the entire contents of which are incorporated herein by reference.

FIELD

Embodiments of the present invention relate to a reserve capacity calculating apparatus and a reserve capacity calculating method, and a computer readable medium for storing a computer program, for example, and relate to, in a demand response (DR) system that requests a customer to restrain power consumption, a reserve capacity calculating apparatus that calculates reducible reserve power (reserve capacity) of the customer before the DR is carried out.

BACKGROUND

Standardization organizations such as OASIS (OpenADR) and ZigBee are promoting automated processing systems for reducing power consumption during critical periods of peak power demand, in which a DRAS (a demand response automated server) located at an electric power company side transmits a power consumption reduction signal (a DR signal) to an EMS (energy managing system) installed at a customer side.

In connection with the system, a method has conventionally been proposed, in which determination is made to how equipment of each customer should be controlled, on the basis of indicators such as comfort and an electric power rate, and a daily load curve is calculated to schedule the total amount of demand to be restrained. In this technique, a method of changing a plan on the basis of each customer's activity of a particular day has not been proposed. Further, a method of calculating reducible reserve power (reserve capacity) of each customer when a plan is changed has not been proposed.

BRIEF DESCRIPTION OF THE DRAWINGS

FIG. 4 illustrates an example of a predicted parameter DB;

FIG. 14 is a diagram for explaining processing of the predicted parameter learning unit;

FIG. 18 illustrates an example of a living information history DB.

DETAILED DESCRIPTION

According to an aspect of embodiments, there is provided a reserve capacity calculating apparatus.

The apparatus includes a reference power consumption receiver, an electric power history database, a temperature history database, a power consumption distribution calculator, a power consumption predicting unit and a reserve capacity calculating unit.

The reference power consumption receiver receives from a demand restraint calculating apparatus a reference power consumption sequence being a power consumption sequence of a first date planned for a customer.

The electric power history database stores therein a power consumption sequence of the customer and demand restraint strength with each date, the power consumption sequence being measured by a power measuring instrument.

The temperature history database stores therein an outdoor temperature sequence of a customer house with each date, the outdoor temperature sequence being measured by a temperature sensor.

The power consumption distribution calculator (a) uses a predicted outdoor temperature sequence given previously of the customer house for a prediction period at the first date from a first time to a second time being later than the first time, (b) identifies, in the temperature history database, dates having a sequence part similar to the predicted outdoor temperature sequence in the prediction period, (c) identifies, with identified dates, in the electric power history database, power consumption sequences having same demand restraint strength as that of the first date, and (d) calculates a statistical distribution or a representative value of identified power consumption sequences for a whole period from a third time to the second time, the third time being earlier than the first time.

The power consumption predicting unit calculates a predicted power consumption sequence in the prediction period using the power consumption sequence measured for a history used period from the third time to the first time at the first date and the statistical distribution or the representative value.

The reserve capacity calculating unit calculates reserve capacity being a difference between a predicted power consumption sequence and a sequence part in the prediction period of the reference power consumption sequence, and to transmit the reserve capacity to the demand restraint calculating apparatus.

Now, embodiments will be described with reference to the drawings.

Figure 1:
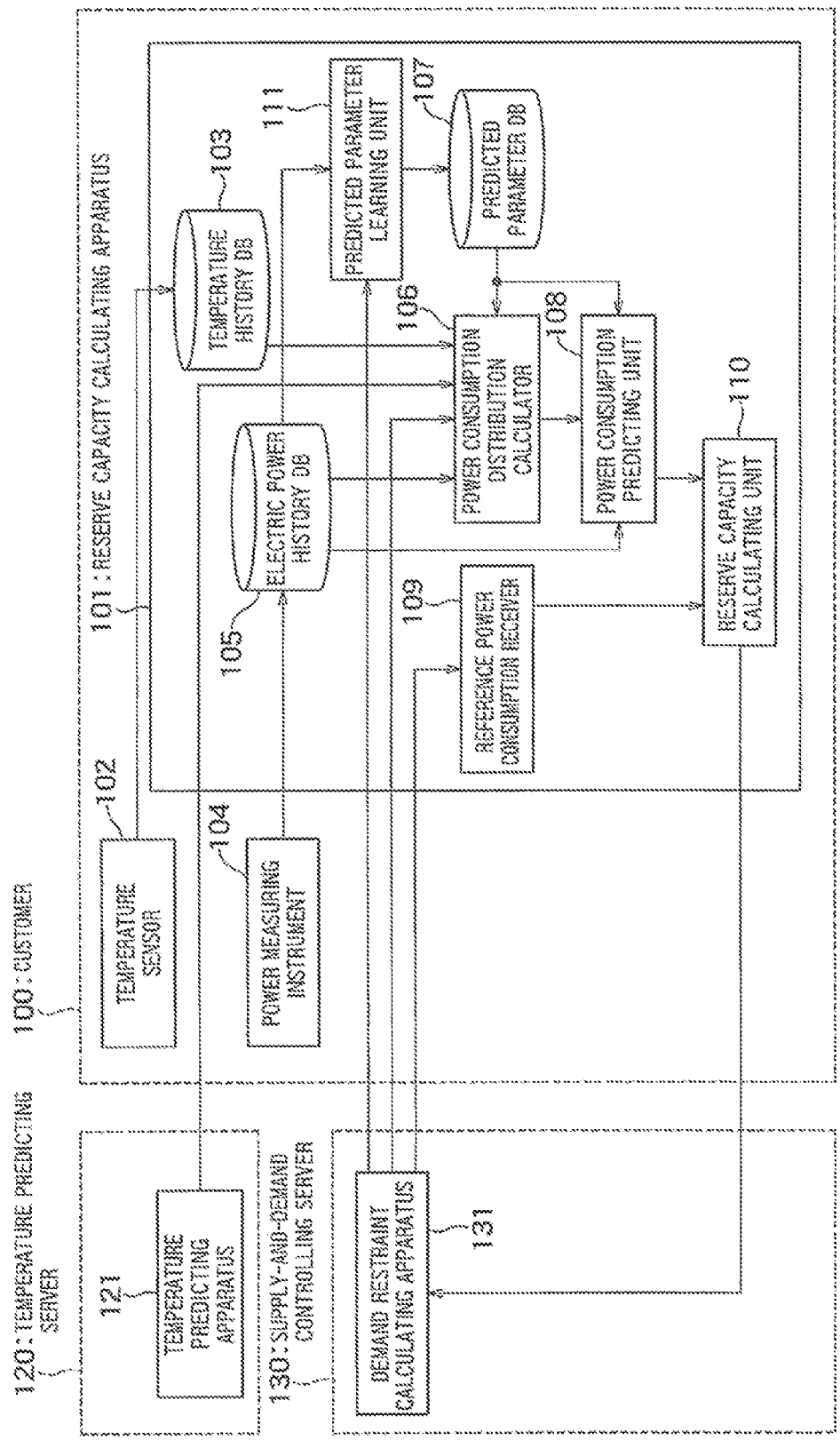
FIG. 1 illustrates an electric power managing system including a reserve capacity calculating apparatus according to an embodiment.

FIG. 1 illustrates an electric power managing system including a reserve capacity calculating apparatus 101 according to an embodiment.

The electric power managing system includes the reserve capacity calculating apparatus 101, a temperature sensor 102, and a power measuring instrument 104 which are located at a customer 100 side. The electric power managing system also includes a supply-and-demand controlling server 130 located at an electric power company side and a temperature predicting server 120 located at a wide area network such as the Internet.

The temperature predicting server 120 includes a temperature predicting apparatus 121. The temperature predicting apparatus 121 predicts outdoor temperature and stores therein the predicted outdoor temperature. The prediction may be carried out on a regional basis, an address basis, or a division of land basis. The temperature predicting apparatus 121 transmits, in response to a request from the reserve capacity calculating apparatus 101, the predicted outdoor temperature data to the customer (an address of the customer or an area including the customer). Specifically, the temperature predicting apparatus 121 transmits outdoor temperature data such as transition data of the outdoor temperature of this whole day or transition data of the outdoor temperature in a period between the time at which the request is made and the end of this day.

Figure 15:
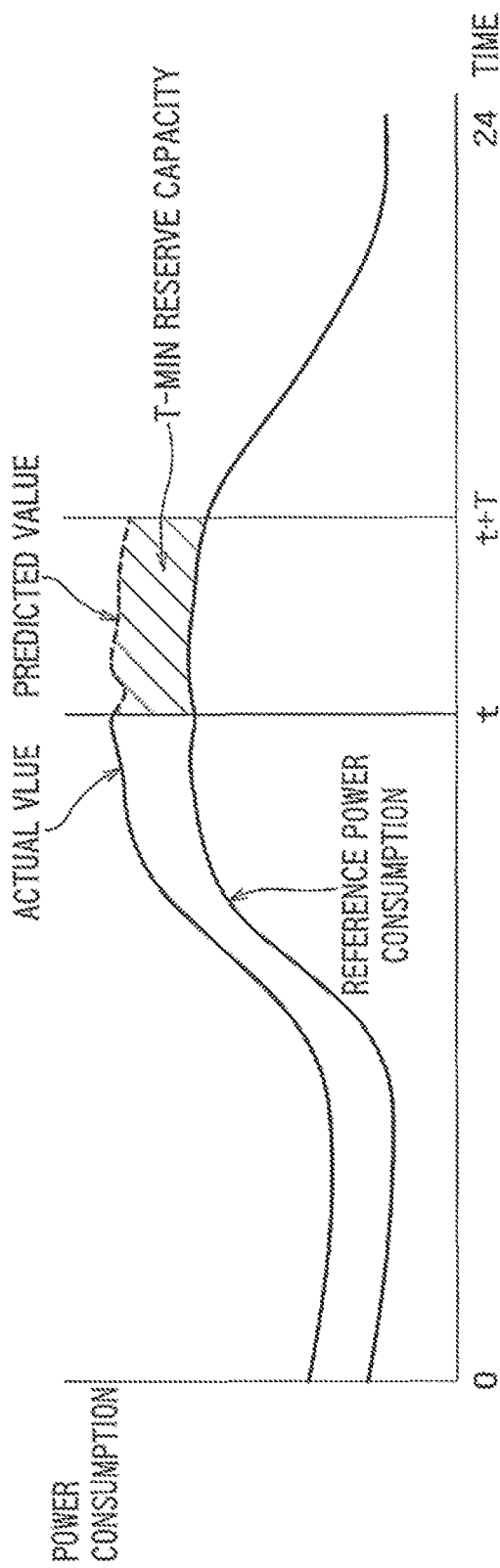
FIG. 15 is a diagram for explaining processing of a reserve capacity calculating unit.

The supply-and-demand controlling server 130 includes a demand restraint calculating apparatus 131. While a demand restraint plan or a supply-and-demand plan is implemented, the demand restraint calculating apparatus 131 calculates a power consumption sequence (a reference power consumption sequence) of each customer and notifies each customer of the calculated sequence. The reference power consumption is calculated on the basis of temperature or some other influence. The reference power consumption is represented as a transition of demand for power consumed on a day-to-day basis (24 hours), for example. As described later, FIG. 15 illustrates an example of the reference power consumption.

The reserve capacity calculating apparatus 101 includes a temperature history DB (database) 103, an electric power history DB 105, a power consumption distribution calculator 106, a predicted parameter DB 107, a power consumption predicting unit 108, a reference power consumption receiver 109, a reserve capacity calculating unit 110, and a predicted parameter learning unit 111.

The reserve capacity calculating apparatus 101 communicates with the temperature sensor 102, the power measuring instrument 104, the temperature predicting apparatus 121, and the demand restraint calculating apparatus 131 to receive data from and exchange data with them.

The temperature sensor 102 measures the outdoor temperature of the customer house at constant intervals and transmits the measured values to the reserve capacity calculating apparatus 101. The temperature sensor 102 may include an internal memory unit that stores the measured values.

The temperature history DB 103 stores the sequence of the outdoor temperature measured by the temperature sensor 102 for each date.

Figure 2:
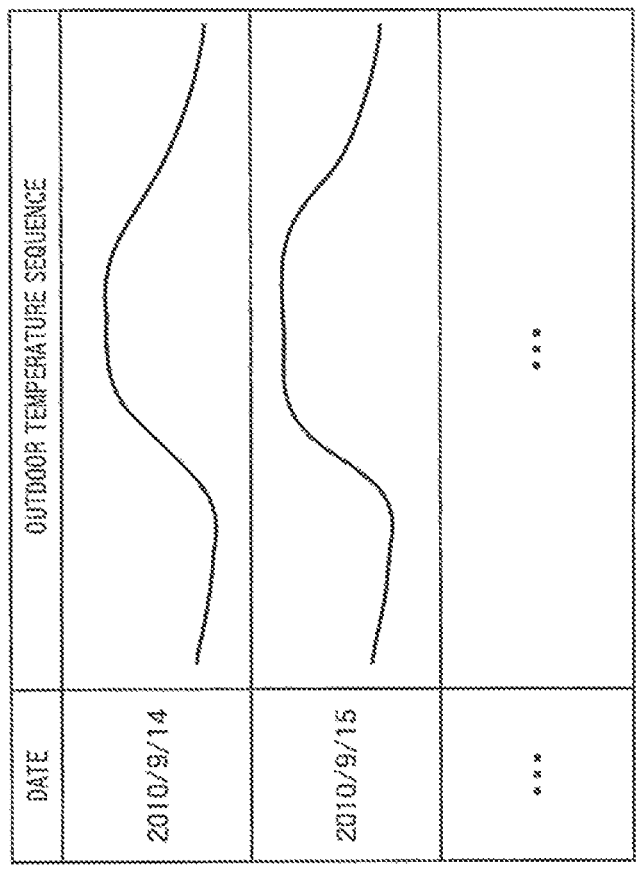
FIG. 2 illustrates an example of a temperature history DB.

FIG. 2 illustrates an example of the temperature history DB 103. The temperature history DB 103 stores the transitions of the outdoor temperature on a day-to-day basis (every 24 hours). The history of the stored outdoor temperatures is used by the power consumption distribution calculator 106.

The power measuring instrument 104 measures the power consumed in the customer house by the customer (e.g., equipment in the house) at constant intervals.

The electric power history DB 105 stores the sequence of the power consumption measured by the power measuring instrument 104 for each date with a demand restraint strength (including "no demand restraint"). That is, the electric power history DB 105 stores the power consumption sequences of the customer on a day-to-day basis (every 24 hours). A value of the demand restraint strength represents a degree of requested demand restraint. It should be noted that it is not essential that the demand restraint strength should be used.

Figure 3:
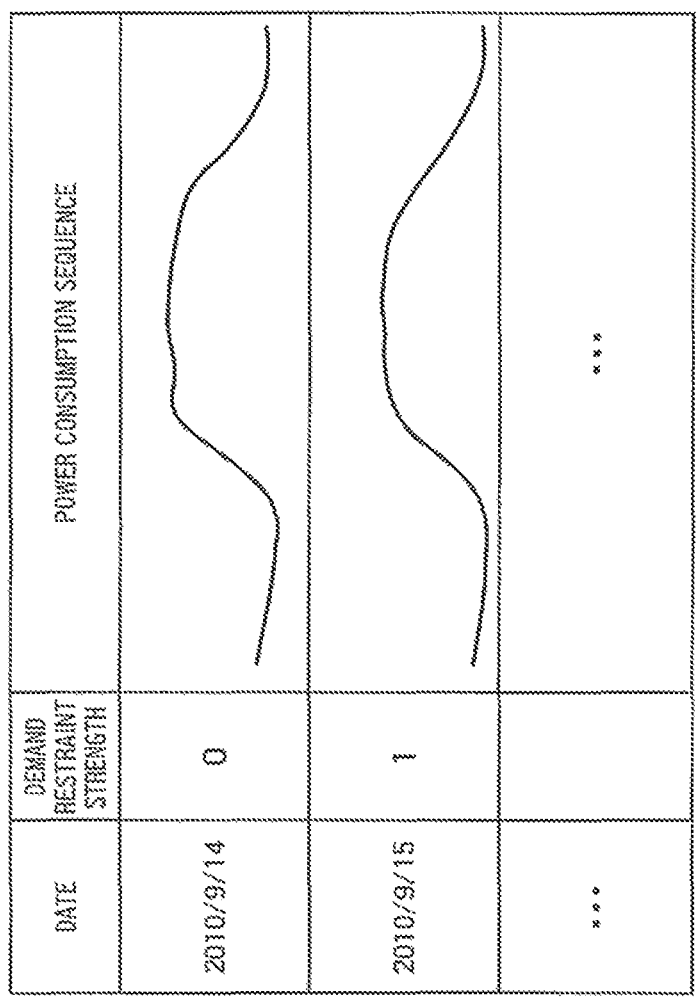
FIG. 3 illustrates an example of an electric power history DB.

FIG. 3 illustrates an example of the electric power history DB 105. The history of the stored power consumption sequences is used in the power consumption distribution calculator 106, the power consumption predicting unit 108, and the predicted parameter learning unit 111.

The predicted parameter DB 107 stores a parameter (a history used period length) with each set of a time (a current time) and a predicted period length, the parameters being used by the power consumption distribution calculator 106 and the power consumption predicting unit 108. FIG. 4 illustrates an example of the predicted parameter DB 107. The demand restraint strength may further be included in the predicted parameter DB 107.

The predicted period length is a length of period for which consumption of electric power will be predicted. The time (current time) is a time at which the prediction processing is executed. The history used period length is an interval length in past data, and when the power consumption distribution calculator 106 performs matching between power consumption sequences or between temperature sequences, this interval length of the past data gone back from the current time is used (as described in detail later).

The predicted parameter learning unit 111 predicts a parameter (a history used period length) of each time using the electric power history DB 105 for each of all variations of the predicted period lengths notified by the demand restraint calculating apparatus 131. The predicted parameter learning unit 111 stores the parameter (the history used period length) calculated for each time and each predicted period length in the predicted parameter DB 107.

The power consumption distribution calculator 106 identifies past days on which the transition of the outdoor temperature is similar to that in this day by waveform matching on the basis of the predicted parameter DB 107, the temperature history DB 103, and the predicted period length notified by the demand restraint calculating apparatus 131. Then, the power consumption distribution calculator 106 identifies, in the electric power history DB 105 from the power consumption sequences in the identified past days, power consumption sequences having the same demand restraint strength as that of the day and electric power consumption transitions similar to the power consumption transition in this day by waveform matching. If the demand restraint strength is not used, similar sequences may be identified by only waveform matching. Incidentally, demand restraint strength may be received from the demand restraint calculating apparatus 131 or the demand restraint strength may given by another arbitrary method.

The period of matching is determined as follows. First, a history used period length is obtained from the predicted parameter DB 107. At this time, a predicted period length and a demand restraint strength are obtained from the demand restraint calculating apparatus 131, and a history used period length is obtained from the predicted parameter DB 107 with the current time, and the obtained predicted period length and the demand restraint strength used as a key. It should be noted that it is not essential that the demand restraint strength should be used.

Then, it is assumed that a period from a time before the history used period length (a third time) with respect to a current time (a first time) to the current time is defined as a history used period. It is also assumed that a period (interval) from the current time "t" to a time after the predicted period length (a second time) is defined as a prediction period. Furthermore, it is also assumed that a period obtained by adding the history used period and the prediction period together is defined as a whole period. Where the current time is "t," the history used period length is "S," and the predicted period length is "T," the third time and the second time can be expressed as "t–S" and "t+T," respectively.

The matching of the temperature sequences is performed, for example, in the total period ("t–S" to "t+T") and the matching of the power consumption sequences is performed, for example, in the history used period. As the temperature sequence of this day in the prediction period of the total period, data from the temperature predicting apparatus is used.

Once the similar power consumption sequences are identified, these identified sequences are used to, in the total period, calculate a statistical distribution or a representative value in each time (at constant intervals). Although the present embodiment shows an example in which averages and standard deviations are calculated, the calculation is not limited thereto as long as characteristics of the distribution can be represented. The power consumption distribution calculator 106 transmits the information of the calculated averages and standard deviations to the power consumption predicting unit 108.

The power consumption predicting unit 108 predicts power consumption in the prediction period (the current time "t" to "t+T") on the basis of the averages and standard deviations calculated by the power consumption distribution calculator 106, the predicted parameter DB 107, and the electric power history DB 105. Specifically, the power consumption predicting unit 108 uses the average values and standard deviations calculated for the past history used period (the time "t–S" to the current time "t") to calculate a deviation rate from the average values with respect to the power consumption sequence of this day. The deviation rate and the standard deviations in the prediction period are used to correct the average values of this day calculated at constant intervals from the current time "t" to the time "t+T." The sequence of the corrected values is obtained as a predicted sequence of the power consumption. The power consumption predicting unit 108 transmits the obtained predicted power consumption sequence to the reserve capacity calculating unit 110.

The reference power consumption receiver 109 obtains, from the demand restraint calculating apparatus 131, a power consumption sequence (a reference power consumption sequence) planned for a customer of interest. The reference power consumption receiver 109 transmits the obtained reference power consumption sequence to the reserve capacity calculating unit 110.

The reserve capacity calculating unit 110 calculates as reserve capacity, a difference between the predicted power consumption sequence calculated by the power consumption predicting unit 108 and the reference power consumption sequence received by the reference power consumption receiver 109 in the interval from the current time "t" and the predicted period length T. The reserve capacity calculating unit 110 transmits the calculated reserve capacity to the demand restraint calculating apparatus 131.

Figure 5:
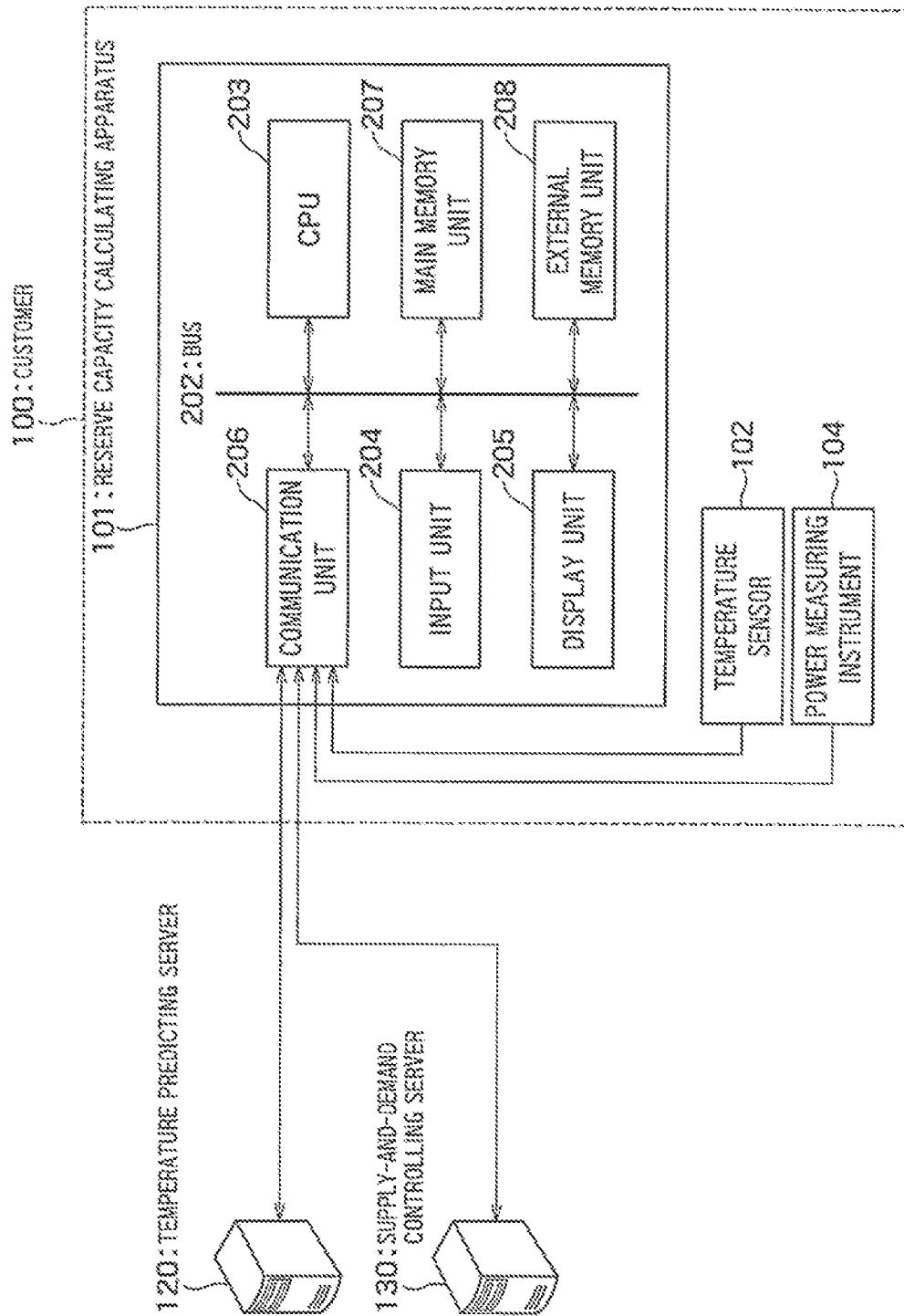
FIG. 5 illustrates an example of a hardware configuration of the reserve capacity calculating apparatus.

FIG. 5 illustrates an example of a hardware configuration of the reserve capacity calculating apparatus 101. The same reference numerals are used for denoting the same components in FIG. 1, and a redundant description thereof is omitted.

The reserve capacity calculating apparatus 101 can be realized by using a computer apparatus as basic hardware. The computer apparatus includes, as illustrated in FIG. 5, a CPU 203, an input unit 204, a display unit 205, a communication unit 206, a main memory unit 207, and an external memory unit 208. These components are connected and communicated with each other via a bus 202.

The input unit 204 includes an input device such as a keyboard and a mouse and outputs an operation signal generated from the input device to the CPU 203.

The display unit 205 is composed of a display such as an LCD (Liquid Crystal Display) and a CRT (Cathode Ray Tube).

The communication unit 206 includes communication means such as Ethernet (registered trademark), a wireless LAN (Local Area Network), Bluetooth (registered trademark), and ZigBee (registered trademark), and communicates with the temperature sensor 102, the power measuring instrument 104, the temperature predicting server 120, and the supply-and-demand controlling server 130.

The external memory unit 208 is composed of a storage medium such as a hard disk drive or a CD-R, a CD-RW, a DVD-RAM, and a DVD-R, and stores a controlling program to cause the CPU 203 to execute the processing of the power consumption distribution calculator 106, the power consumption predicting unit 108, the reference power consumption receiver 109, and the reserve capacity calculating unit 110. In addition, the storage medium stores as data the temperature history DB 103, the electric power history DB 105, the predicted parameter DB 107, and the like.

The main memory unit 207 is composed of memory or the like. The main memory unit 207 deploys the controlling program stored in the external memory unit 208 under the control of the CPU 203, and stores data required when the program is executed, data generated as a result of the execution of the program, and the like. The controlling program may be realized by being installed in the computer apparatus beforehand or by being stored in a storage medium such as a CD-ROM. Alternatively, the controlling program may be distributed via a network and installed in the computer apparatus as needed.

Figure 6:
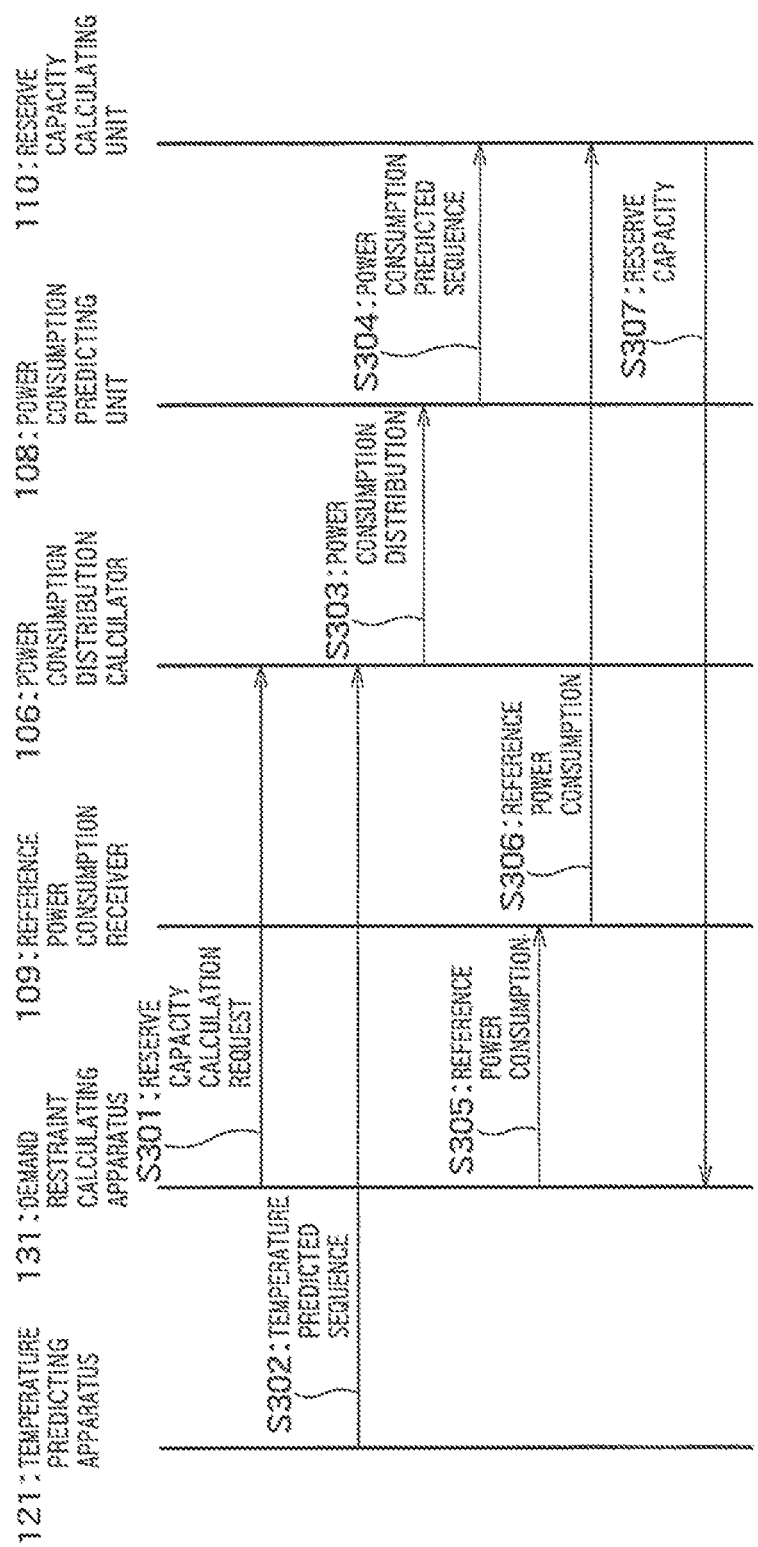
FIG. 6 illustrates an example of a communication procedure performed between components of the reserve capacity calculating apparatus.

FIG. 6 illustrates an example of a communication procedure performed when the temperature predicting apparatus 121, the demand restraint calculating apparatus 131, the power receiver 109 in the reserve capacity calculating apparatus, the power consumption distribution calculator 106, the power consumption predicting unit 108, and the reserve capacity calculating unit 110 interact with each other to operate.

In step S301, the demand restraint calculating apparatus 131 transmits a reserve capacity calculation request including a predicted period length and a demand restraint strength to the power consumption distribution calculator 106, thereby starting the reserve capacity calculation processing by the reserve capacity calculating apparatus 101.

In step S302, the temperature predicting apparatus 121 transmits a predicted temperature sequence to the power consumption distribution calculator 106 in response to a request from the power consumption distribution calculator 106. The transmitted predicted temperature sequence is a sequence of at least a current time (first time) "t" or later. The current time (first time) "t" is a time at which the reserve capacity calculating apparatus carries out the calculation. For example, the current time (first time) "t" is a time at which the reserve capacity calculation request is received or a designated time if the reserve capacity calculation request includes time designation.

The power consumption distribution calculator 106 calculates a power consumption distribution (averages and standard deviations as a statistical distribution or representative values, described later in detail). In step S303, the power consumption distribution calculator 106 transmits the calculated power consumption distribution to the power consumption predicting unit 108.

The power consumption predicting unit 108 uses the power consumption distribution to predict a power consumption sequence in a prediction period. In step S304, the power consumption predicting unit 108 transmits the predicted power consumption sequence to the reserve capacity calculating unit 110.

On the other hand, in step S305, the demand restraint calculating apparatus 131 transmits a reference power consumption sequence to the reference power consumption receiver 109. It should be noted that the timing of the step S305 may be the same as that of the step S301 or may be the timing at which the demand restraint calculating apparatus 131 receives a request from the reference power consumption receiver 109. Here, for simplicity, it is assumed that the step S305 is carried out a fixed period of time after the step S301.

In step S306, the reference power consumption receiver 109 transmits the reference power consumption sequence received from the demand restraint calculating apparatus 131 to the reserve capacity calculating unit 110.

The reserve capacity calculating unit 110 calculates reserve capacity on the basis of the predicted power consumption sequence and the reference power consumption sequence. In step S307, the reserve capacity calculating unit 110 transmits the calculated reserve capacity to the demand restraint calculating apparatus 131.

Figure 7:
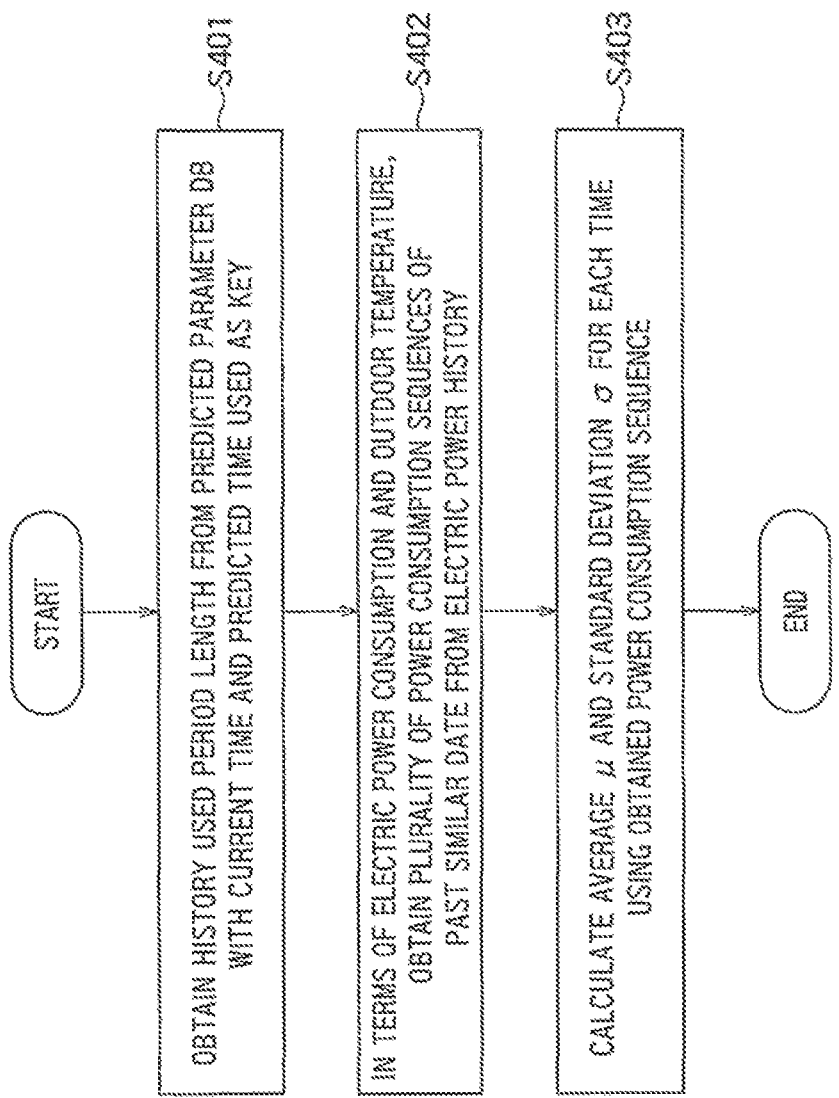
FIG. 7 illustrates an example of a procedure of a power consumption distribution calculator.

FIG. 7 illustrates an example of a procedure of the power consumption distribution calculator 106 in FIG. 1.

When the step S301 and the step S302 in FIG. 6 are carried out, a step S401 in FIG. 7 is carried out. In step S401, a history used period length (a predicted parameter) S is obtained from the predicted parameter DB 107 (see FIG. 4) with the current time "t" and the predicted period length "T" used as a key.

In step S402, on the basis of the power consumption sequence in the history used period of this day (the day on which the reserve capacity calculation request is received), the outdoor temperature sequence in the history used period of this day, the predicted temperature sequence in the prediction period obtained from the temperature predicting apparatus 121, and the demand restraint strength obtained from the demand restraint calculating apparatus 131, past days having patterns of the outdoor temperature and the power consumption that are similar to those patterns of this day is identified, and the power consumption sequences of the identified days are obtained from the electric power history DB 105 in FIG. 3.

Figure 8:
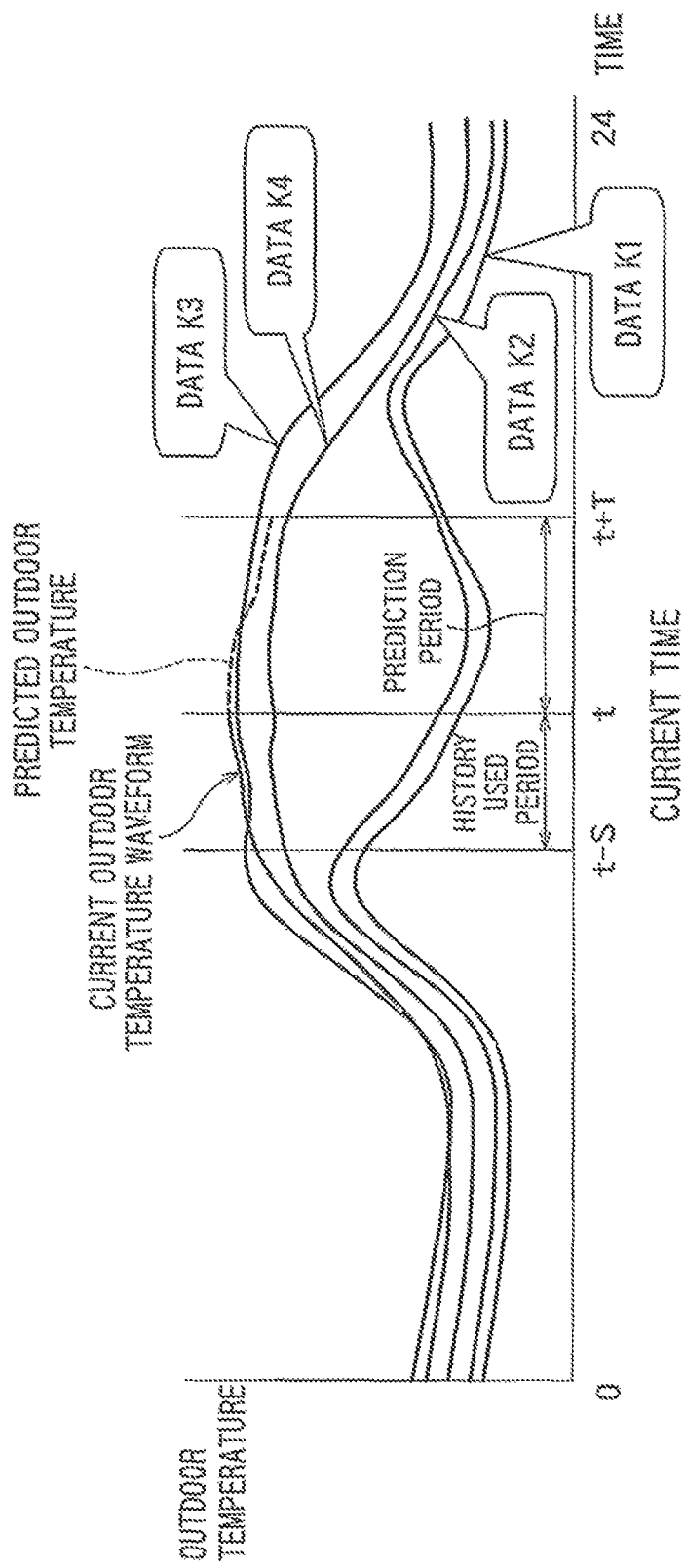
FIG. 8 illustrates an example of identifying a similar outdoor temperature sequence.

The operation of the step S402 will be described in detail. As illustrated in FIG. 8, of an outdoor temperature waveform (a current outdoor temperature waveform) of this day, an outdoor temperature sequence in the history used period is connected with a predicted temperature sequence in the prediction period, and in the period of the history used period and the prediction period (the total period), temperature sequences having a waveform (a sequence part) similar to the connected temperature sequence are identified in the temperature history DB 103. For example, data (an outdoor temperature sequence) K3 and data K4 are identified. Although the temperature sequences of the history have a time length of 0 to 24 hours, in the similarity determination, only the data in the total period (the history used period and the prediction period) is used.

As a distance measure for measuring similarity between data items, there is a method in which simply a Euclidean distance is used or a method in which broken line approximation is performed on sequence data before a Euclidean distance of each interval is used. A plurality of closest sequences may be adopted or sequences having a distance equal to or smaller than a threshold value may be adopted.

Figure 9:
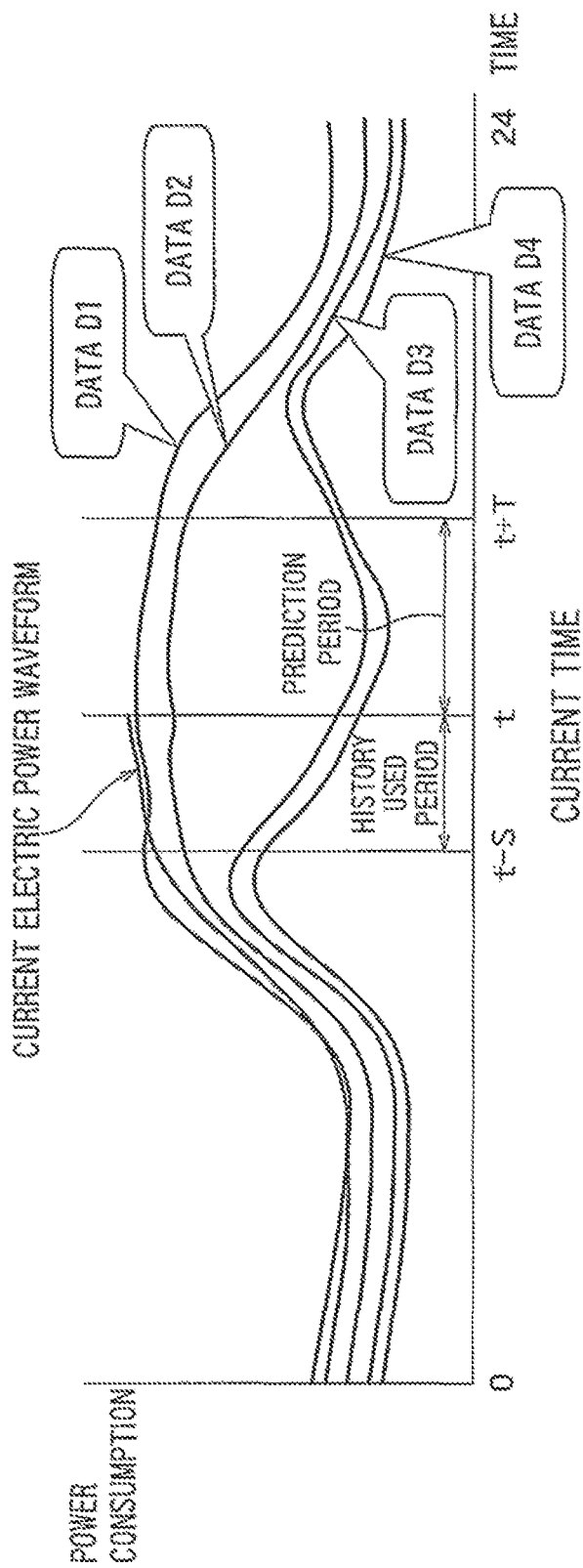
FIG. 9 illustrates an example of identifying a similar power consumption sequence.

All the past power consumption sequences having the same date as the date of the temperature sequence detected as similar one (and the same demand restraint strength) are read out from the electric power history DB 105. Then, as illustrated in FIG. 9, the sequence in the history used period of the power consumption sequence of this day is compared to read-out past power consumption sequences (here, sequences D1, D2, D3, and D4 are read out) in the history used period, and all the similar past power consumption sequences are identified. For example, the data items (power consumption sequences) D1 and D2 are identified as similar data (assume that the demand restraint strengths are identical). Similarity determination processing is carried out in accordance with the foregoing description.

The number to be identified (assume "N") may be designated beforehand, and in this case, only a designated number of past power consumption sequences are identified. It should be noted that if the number of read-out power consumption sequences is already smaller than the designated number "N," the process flow may return to the above-described similarity determination of the outdoor temperature sequences and the processing may start again with a looser similarity criterion. Further, the number of power consumption sequences may not necessarily be complemented.

In the processing, the similarity determination of the temperature sequences is made in the total period, but the determination may be made in at least a period including the prediction period. The determination may be made in a period from a start time (at midnight) of this day to the time "t+T."

The reason why the similarity determination is made with the temperature sequences in the processing is that the outdoor temperature significantly influences the power consumption of the customer (in particular, the power consumption of an air conditioner).

In the present embodiment, the past temperature sequences are obtained from the temperature history DB 103. However, if the past temperature sequences are stored in an external server such as the temperature predicting server 120, the past temperature sequence may be obtained from the external server. In this case, the temperature sensor 102 and the temperature history DB may be removed from the customer house.

Figure 10:
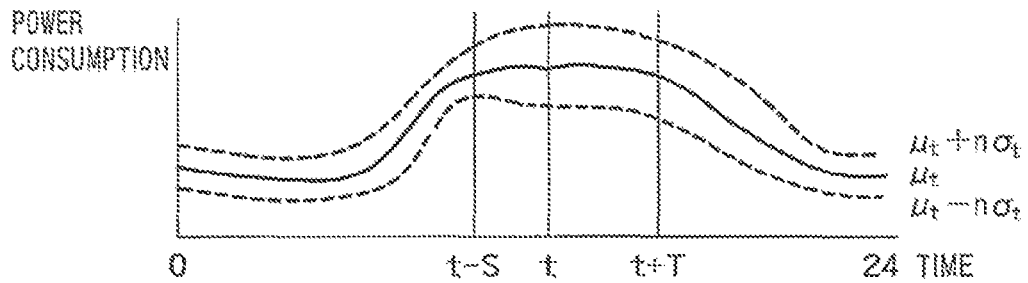
FIG. 10 illustrates an example of calculating an average value and a standard deviation.

In step S403, all the power consumption sequences identified in step S402 are used to calculate an average value "$\mu_t$" and a standard deviation "$\sigma_t$" at constant intervals, respectively. As illustrated in FIG. 10, the calculation is performed at least in the above-described whole period (the history used period and the prediction period). Specifically, starting with the time "t−S" and ending at the time "t+T," an average value and a standard deviation are calculated between the identified power consumption sequences at constant intervals, respectively.

Figure 11:
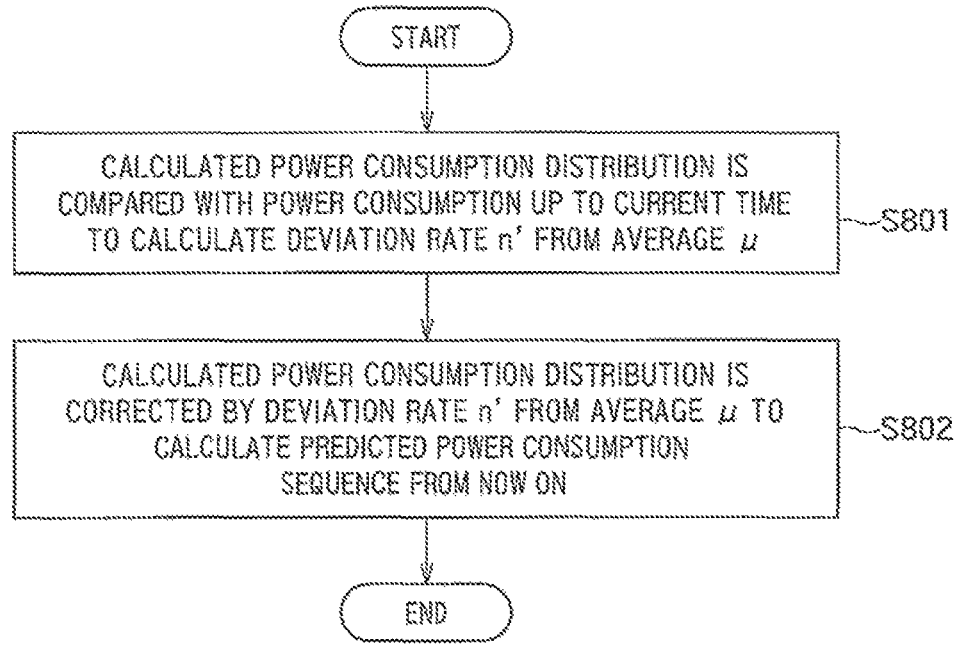
FIG. 11 illustrates an example of a procedure of a power consumption predicting unit.

FIG. 11 illustrates an example of a procedure of the power consumption predicting unit 108 in FIG. 1.

When the step S303 in FIG. 6 is carried out, a step S801 in FIG. 11 is carried out.

In step S801, in the data from the time "t−S" to the current time "t" of the power consumption sequence of this day (data of the history used period), a deviation rate "n" from the average value "$\mu_t$" is calculated at constant intervals.

The deviation rate "n" is calculated as follows:

$$n' = (\Sigma(y_t - \mu_t)/\sigma_t)/S \qquad \text{Equation 1}$$

The parameter "$y_t$" denotes the power consumption in the time "t." The parameters "$\mu_t$" and "$\sigma_t$" denote the average value and the standard deviation in the time "t," respectively. The parameter "S" denotes the history used period length.

In step S802, the deviation rate "n" calculated in the equation 1, the average value "$\mu_t$" and the standard deviation "$\sigma_t$" of each of the constant intervals in the prediction period (the times "t" to "t+T") are used to calculate the predicted power consumption sequence "$z_t$" in the prediction period.

Specifically, the predicted power consumption sequence "$z_t$" is calculated in the following equation 2.

$$z_t = \mu_t + n'\sigma_t \quad \text{Equation 2}$$

Figure 12:
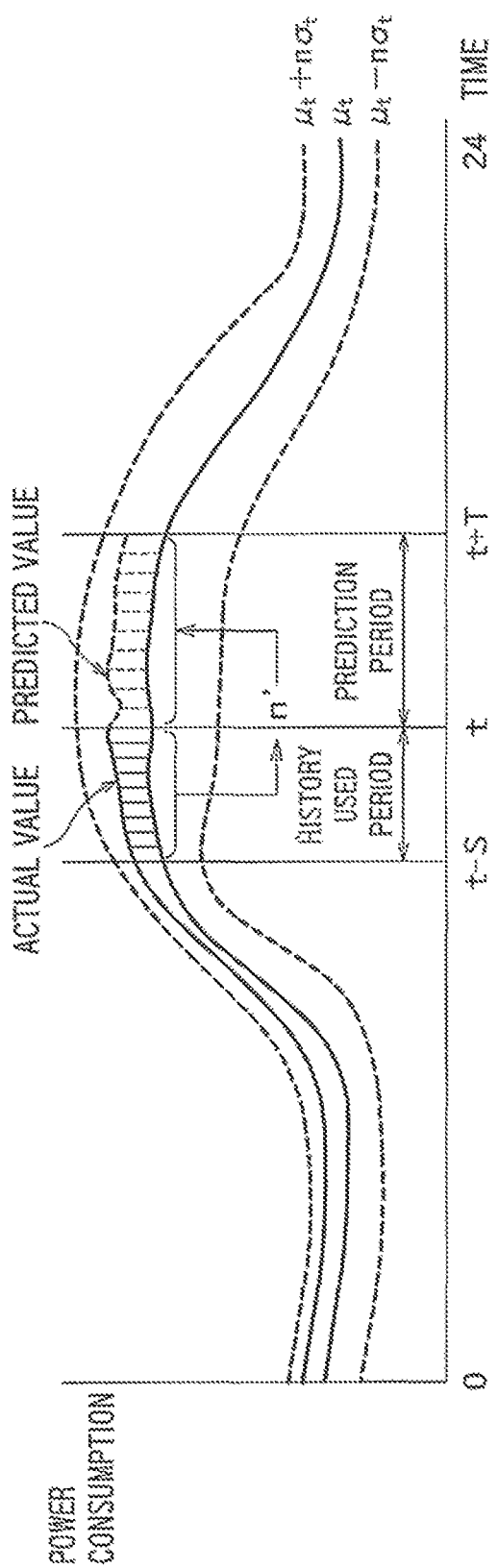
FIG. 12 schematically illustrates an example of calculating a deviation rate and a predicted value.

That is, assuming that the deviation rate "n" calculated in the history used period remains constant after the current time "t," the power consumption is predicted. FIG. 12 schematically illustrates an example of calculating the deviation rate "n'" and the predicted values in this step.

Figure 13:
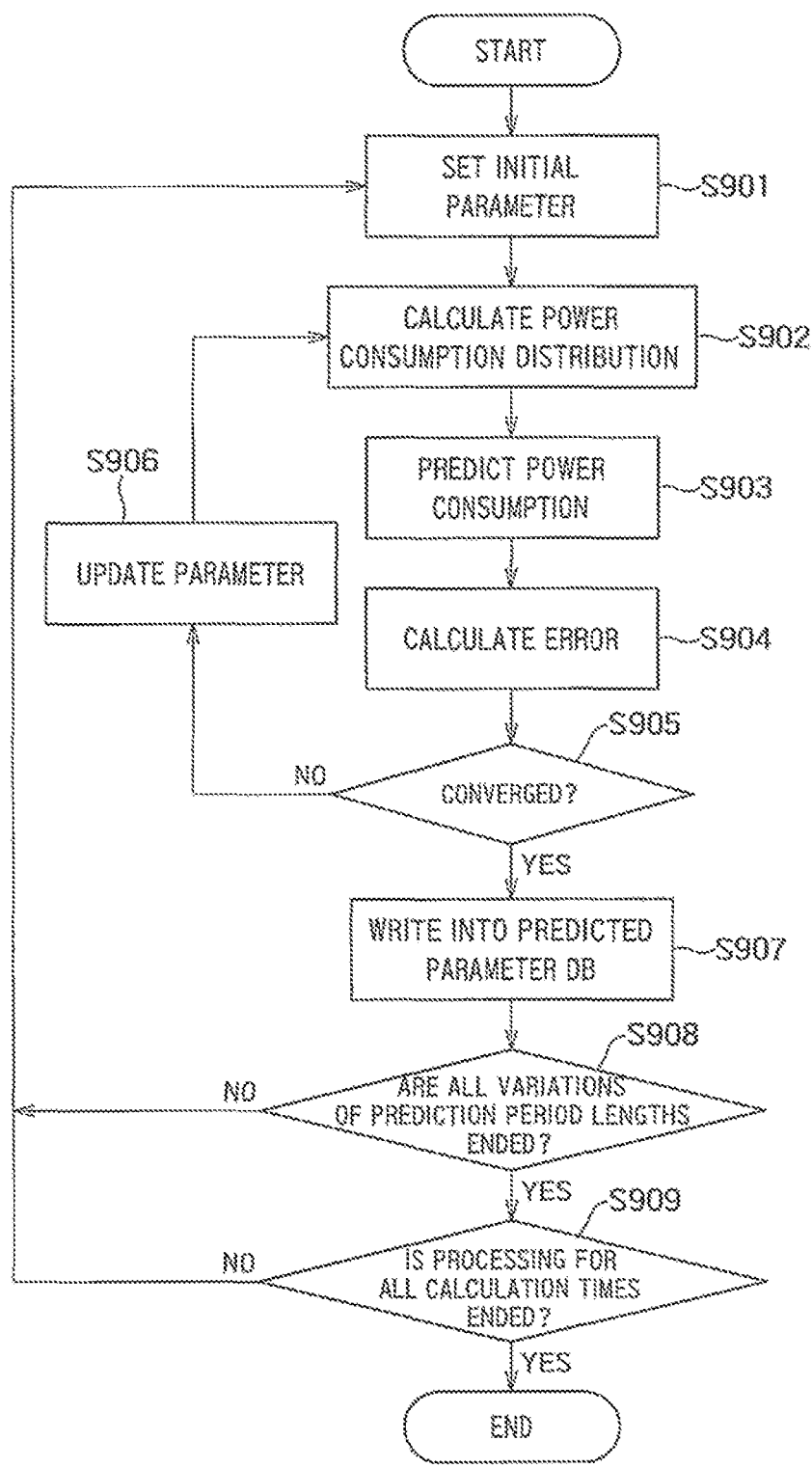
FIG. 13 illustrates an example of a procedure of a predicted parameter learning unit.

FIG. 13 illustrates an example of a procedure of the predicted parameter learning unit 111 in FIG. 1. The processing calculates a history used period length in each time for each of all the variations of the predicted period lengths. FIG. 14 schematically illustrates a procedure of this processing. This example shows the case where the demand restraint strength is not used, but the case where the demand restraint strength is used may be carried out in the same manner.

In step S901 of FIG. 13, initial values of the calculation time (the current time) "t," the predicted period length "T," and the history used period length "S" are given. For example, it is assumed that the calculation time "t" is "00:00:00," the predicted period length "T" is 60 minutes, and the history used period length "S" is 60 minutes.

The step S901 may be carried out at constant intervals or when a certain amount of data is stored in the electric power history DB 105. Alternatively, the step S901 may be carried out when all the variations of the predicted times obtained from the demand restraint calculating apparatus 131 in FIG. 1 are changed.

In step S902, the power consumption distribution calculation processing shown by the flow in FIG. 7 is executed to calculate an average value "$\mu_t$" and a standard deviation "$\sigma_t$" of the power consumption in each of the constant time intervals in the whole period (from the time "t−S" to the time "t+T"). Specifically, the processing is executed on the power consumption sequences of the dates before a target date to calculate the average values "$\mu_t$" and the standard deviations "$\sigma_t$." Any target date may be designated when the processing is executed. For example, the most recent date in the past history or some other date may be designated.

In step S903, the power consumption prediction processing shown by the flow in FIG. 11 is executed to calculate predicted power consumption sequence of the target date.

In step S904, the predicted power consumption sequence calculated in step S903 is compared with the power consumption sequences used for the power consumption distribution calculation processing of the step S902 to calculate an error in the prediction period. Specifically, the error is calculated using the following equation 3.

$$E = \frac{1}{|D|} \sum_{y \in D} \sum_t (\mu_t + n'\sigma_t - y_t)^2 \quad \text{Equation 3}$$

In the equation, "D" denotes a set of the power consumption sequences used for the power consumption distribution calculation processing and "|D|" denotes the number of the power consumption sequences included in "D."

In step S905, it is determined whether or not the error E calculated in step S904 is equal to or smaller than a threshold value. If the error E is equal to or smaller than the threshold value (if the error E has converged), a step S907 is carried out and if the error E is larger than the threshold value, a step S906 is carried out.

In step S906, the history used period length "S" is updated with "S+ΔS." The parameter "ΔS" is given beforehand (for example, 15 minutes).

In step S907, information of the calculation time, the predicted period length, and the history used period length is written in the predicted parameter DB 107 in FIG. 1.

In step S908, it is determined whether all the variations of the predicted period lengths have ended. If all the variations have ended, a step S909 is carried out, and if not, the processing returns to the step S901, and the processing is executed with a next variation of the predicted period lengths. All the variations of the predicted period lengths are given beforehand. All the variations of the predicted period lengths may be designated by the demand restraint calculating apparatus 131.

In step S909, it is determined whether the processing has ended for all the calculation times. If the processing has ended, the predicted parameter calculation processing comes to end, and if not, the processing returns to step S901. Then, the processing is executed with the calculation time (the current time) shifted to a next time (for example, set forward 15 minutes).

FIG. 15 is a diagram for explaining processing of the reserve capacity calculating unit 110.

The reserve capacity calculating unit 110 calculates, as reserve capacity, a difference between the predicted power consumption sequence in the prediction period (from the current time "t" to the time "t+T") and a prediction period part of the reference power consumption sequence from the demand restraint calculating apparatus 131. A hatched part in the drawing corresponds to the reserve capacity. The reference power consumption sequence represents each customer's demand (electric power consumption) planned by the supply-and-demand controlling server with influences such as temperature taken into consideration.

Thus, according to the embodiment, a supply-and-demand controlling server of an electric power company performs the power consumption prediction of a customer before carrying out a DR, and thereby the reserve capacity of the customer is allowed to be estimated.

In addition, because the calculation of the reserve capacity of the customer can increase the calculation accuracy of a requested amount of power consumption restraint in the supply-and-demand controlling server, the possibility of paying excessive incentives to the customer can be reduced.

Figure 16:
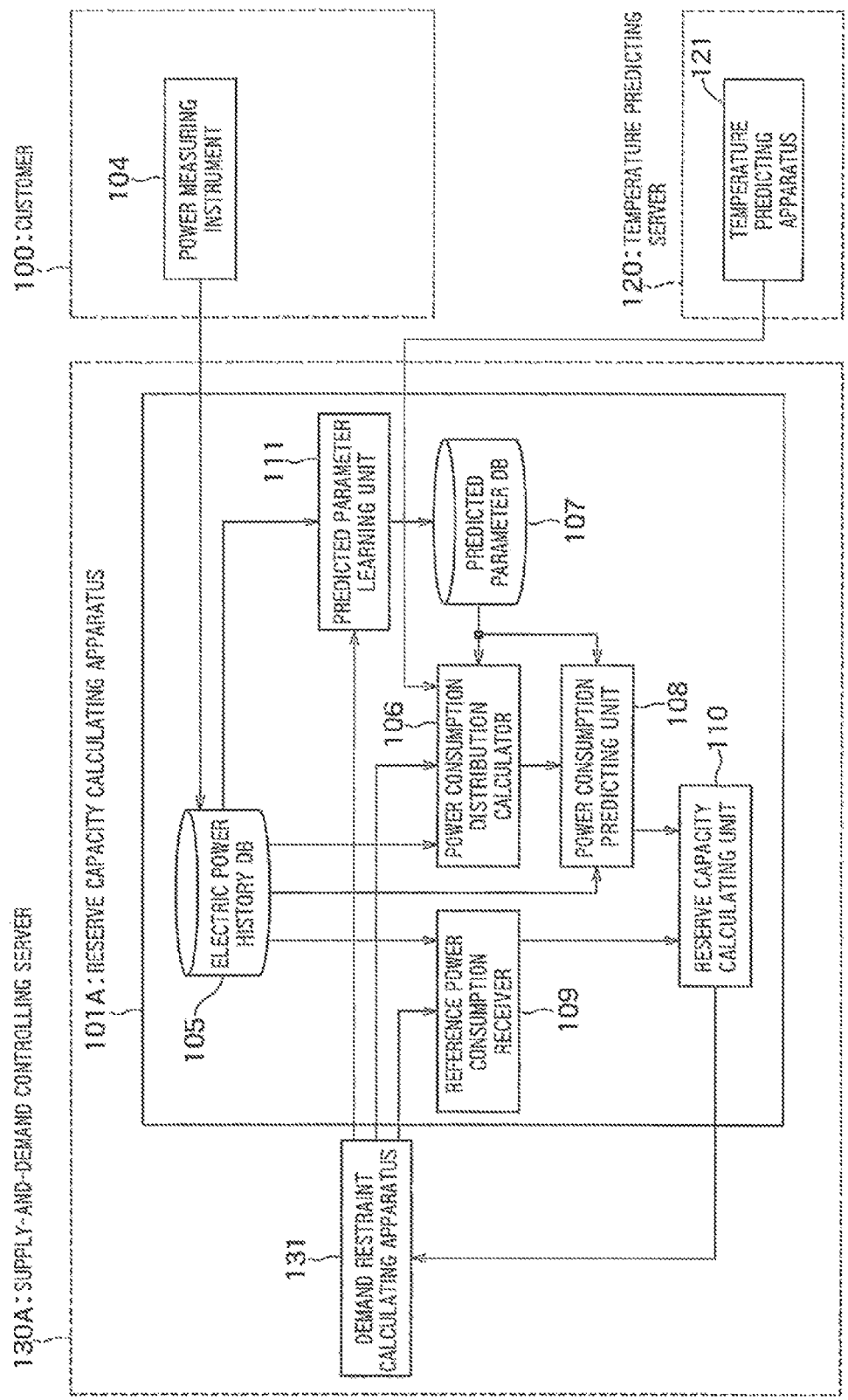
FIG. 16 illustrates a reserve capacity calculating apparatus according to a second embodiment of the present invention.

FIG. 16 illustrates a reserve capacity calculating apparatus 101A according to a second embodiment.

The reserve capacity calculating apparatus 101A according to the embodiment is installed in a supply-and-demand controlling server 130A and connected with the power measuring instrument 104 installed in the customer 100 via a network. Because the other components are same as those in the first embodiment, a description thereof is omitted.

Figure 17:
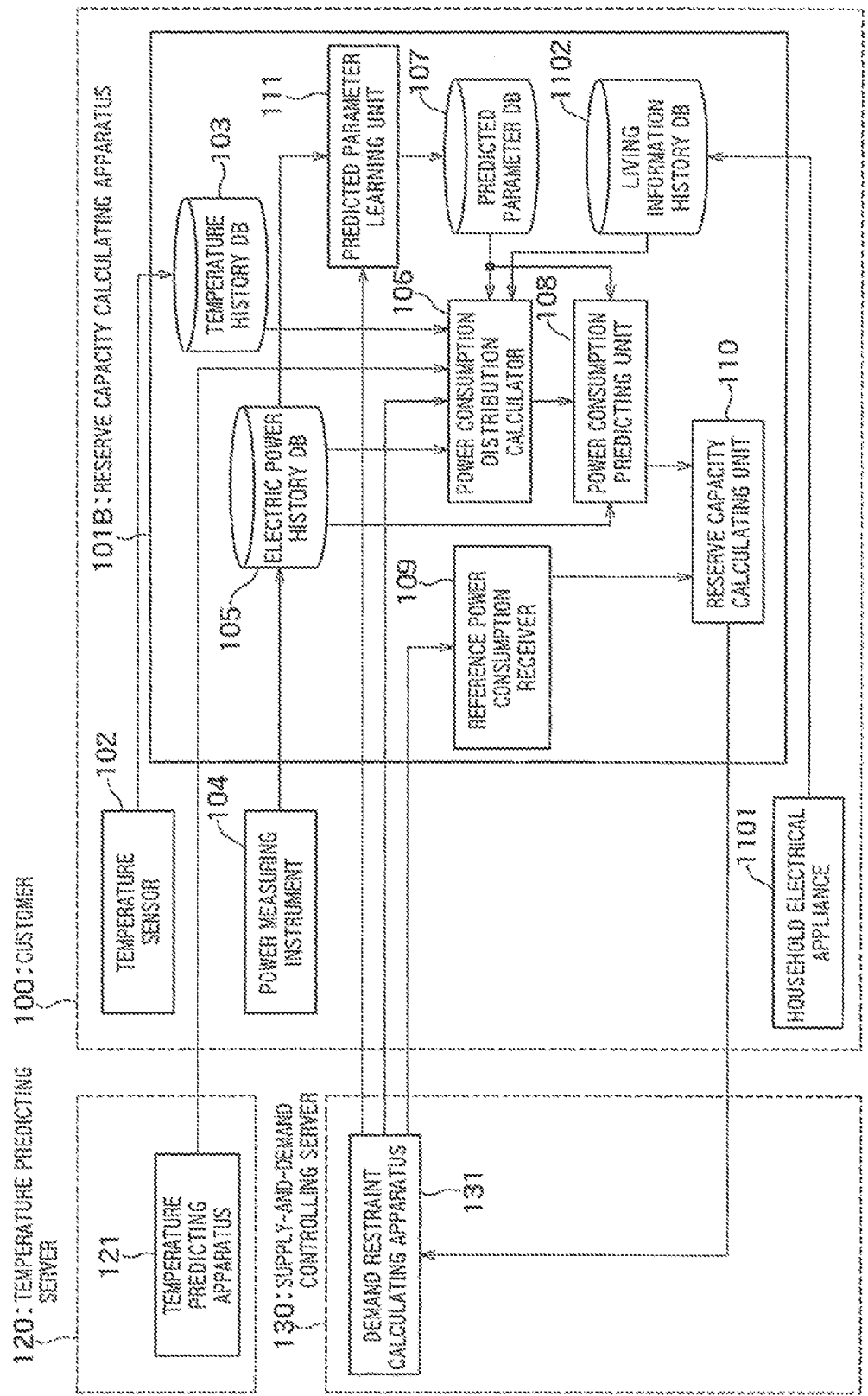
FIG. 17 illustrates a reserve capacity calculating apparatus according to a third embodiment of the present invention.

FIG. 17 illustrates a reserve capacity calculating apparatus 101B according to a third embodiment.

The reserve capacity calculating apparatus 101B according to the embodiment is configured by further including a living information history DB 1102 in addition to the components of the first embodiment. A household electrical appliance 1101 is installed in the customer house.

The living information history DB 1102 regularly stores a household electrical appliance state obtained from the household electrical appliance 1101 and a history from a sensor in the customer house.

FIG. 18 illustrates an example of the living information history DB 1102. The number of persons in each room, outdoor temperature, room temperature of each room, set temperature of an air conditioner, an on/off state of a TV and the like are shown in minutes. The data of the living information history DB 1102 is used by the power consumption distribution calculator 106.

The power consumption distribution calculator 106 determines the similarity of the outdoor temperature sequences as described in the first embodiment as well as determines similarity between a past living information history and living information of this day in the period from the time "t−S" to the time "t." The similarity determination may be made by, for example, in a comparison interval for each field in FIG. 18, calculating an average value, taking a mode, taking a value at a current time, and so on, to obtain vectors constituted by arranging a representative value of each field, and then performing comparison between the vectors. Then, a date at which a distance between the vectors is equal to or smaller than a threshold value may be detected. Using this, the present embodiment identifies a similar past day in terms of a living information history, a temperature history, and a power consumption history to carry out prediction by using a power consumption sequence of a particular day. Since a specific method is evident from the description of the first embodiment, a description thereof is omitted.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. A reserve capacity calculating apparatus comprising:
   a reference power consumption receiver configured to receive from a demand restraint calculating apparatus a reference power consumption sequence being a power consumption sequence of a first date planned for a customer;
   an electric power history database configured to store therein a power consumption sequence of the customer and demand restraint strength with each date, the power consumption sequence being measured by a power measuring instrument;
   a temperature history database configured to store therein an outdoor temperature sequence of a customer house with each date, the outdoor temperature sequence being measured by a temperature sensor;
   a power consumption distribution calculator configured to (a) use a predicted outdoor temperature sequence given previously of the customer house for a prediction period at the first date from a first time to a second time being later than the first time, (b) identify, in the temperature history database, dates having a sequence part similar to the predicted outdoor temperature sequence in the prediction period, (c) identify, with identified dates, in the electric power history database, power consumption sequences having same demand restraint strength as that of the first date, and (d) calculate a statistical distribution or a representative value of identified power consumption sequences for each of a history used period from a third time to the first time and the prediction period, the third time being earlier than the first time;
   a power consumption predicting unit configured to correct the statistical distribution or the representative value of the prediction period based on the power consumption sequence measured for the history used period at the first date and the statistical distribution or the representative value of the history used period and predict a power consumption sequence in the prediction period based on the corrected statistical distribution or the corrected representative value of the prediction period; and
   a reserve capacity calculating unit configured to calculate reserve capacity being a difference between a predicted power consumption sequence and a sequence part in the prediction period of the reference power consumption sequence, and to transmit the reserve capacity to the demand restraint calculating apparatus.

2. The apparatus according to claim 1, wherein the power consumption distribution calculator calculates average values and standard deviations at constant intervals in each of the history used period and the prediction period as the statistical distribution or the representative value, and
   the power consumption predicting unit calculates a deviation rate from the average values with respect to the power consumption sequence in the history used period at the first date and calculates the predicted power consumption sequence in the prediction period at the first date using the average values and the standard deviations in the prediction period and the deviation rate.

3. The apparatus according to claim 2, wherein the power consumption distribution calculator uses sequences similar to the power consumption sequence at the first date in the history used period, out of the identified power consumption sequences, to calculate the average values and the standard deviations.

4. The apparatus according to claim 3, wherein the power consumption predicting unit obtains the deviation rate by subtracting the average values in the history used period from values at the constant intervals in the history used period with respect to the power consumption sequence of the first date, dividing resultant, values by the standard deviations in the history used period, summing up, and dividing a summed up value by a length of the history used period.

5. The apparatus according to claim 4, wherein the power consumption predicting unit obtains the predicted power consumption sequence by multiplying the deviation rate by standard deviations in the prediction period and adding the averages in the prediction period to multiplied values.

6. The apparatus according to claim 1, further comprising a predicted parameter database configured to hold a time, a predicted period length, and a history used period length associated with each other,
   wherein the power consumption distribution calculator receives a value of the predicted period length, from the demand restraint calculating apparatus, obtains from the predicted parameter database a history used period length associated with the first time and a received value, and determines an obtained history used period length as a length of the history used period from the third time to the first time.

7. The apparatus according to claim 6, further comprising a predicted parameter learning unit configured to use a power consumption sequence of a past day stored in the electric power history database, the power consumption distribution calculator, and the power consumption predicting unit to determine a history used period length to each of a plurality of predicted period lengths for each of a plurality of times,
wherein the predicted parameter learning unit predicts the power consumption for each of the predicted period lengths for each of the times, and determines the history used period length so that a difference between the predicted power consumption and the power consumption stored in the electric power history database is equal to or smaller than a threshold value.

8. The apparatus according to claim 1, further comprising a device configured to receive the predicted outdoor temperature sequence of the customer house from an external temperature predicting apparatus.

9. A processor-implemented reserve capacity calculating method comprising:
receiving from a demand restraint calculating apparatus a reference power consumption sequence being a power consumption sequence of a first date planned for a customer;
storing in an electric power history database a power consumption sequence of the customer and demand restraint strength with each date, the power consumption sequence being measured by a power measuring instrument;
storing in a temperature history database an outdoor temperature sequence of a customer house with each date, the outdoor temperature sequence being measured by a temperature sensor;
(a) using a predicted outdoor temperature sequence given previously of the customer house for a prediction period at the first date from a first time to a second time being later than the first time, (b) identifying, in the temperature history database, dates having a sequence part similar to the predicted outdoor temperature sequence in the prediction period, (c) identifying, with identified dates, in the electric power history database, power consumption sequences having same demand restraint strength as that of the first date, and (d) calculating a statistical distribution or a representative value of identified power consumption sequences for each of a history used period from a third time to the first time and the prediction period, the third time being earlier than the first time;
correcting the statistical distribution or the representative value of the prediction period based on the power consumption sequence measured for the history used period at the first date and the statistical distribution or the representative value of the history used period and predicting a power consumption sequence in the prediction period based on the corrected statistical distribution or the corrected representative value of the prediction period; and
calculating reserve capacity being a difference between a predicted power consumption sequence and a sequence part in the prediction period of the reference power consumption sequence, and to transmit the reserve capacity to the demand restraint calculating apparatus.

10. A non-transitory computer readable medium storing a program, when executed by a computer, causing the computer to perform the steps comprising:
receiving from a demand restraint calculating apparatus a reference power consumption sequence being a power consumption sequence of a first date planned for a customer;
storing in an electric power history database a power consumption sequence of the customer and demand restraint strength with each date, the power consumption sequence being measured by a power measuring instrument;
storing in a temperature history database an outdoor temperature sequence of a customer house with each date, the outdoor temperature sequence being measured by a temperature sensor;
(a) using a predicted outdoor temperature sequence given previously of the customer house for a prediction period at the first date from a first time to a second time being later than the first time, (b) identifying, in the temperature history database, dates having a sequence part similar to the predicted outdoor temperature sequence in the prediction period, (c) identifying, with identified dates, in the electric power history database, power consumption sequences having same demand restraint strength as that of the first date, and (d) calculating a statistical distribution or a representative value of identified power consumption sequences for each of a history used period from a third time to the first time and the prediction period, the third time being earlier than the first time;
correcting the statistical distribution or the representative value of the prediction period based on the power consumption sequence measured for the history used period at the first date and the statistical distribution or the representative value of the history used period and predicting a power consumption sequence in the predication period based on the corrected statistical distribution or the corrected representative value of the prediction period; and
calculating reserve capacity being a difference between a predicted power consumption sequence and a sequence part in the prediction period of the reference power consumption sequence, and to transmit the reserve capacity to the demand restraint calculating apparatus.

* * * * *